US012140985B2

(12) United States Patent
Abbasi

(10) Patent No.: US 12,140,985 B2
(45) Date of Patent: Nov. 12, 2024

(54) LOW DROPOUT REGULATOR

(71) Applicant: Key ASIC Inc., Hsinchu County (TW)

(72) Inventor: Shahbaz Abbasi, Hsinchu County (TW)

(73) Assignee: KEY ASIC INC., Hsinchu County (TW)

( * ) Notice: Subject to any disclaimer, the term of this patent is extended or adjusted under 35 U.S.C. 154(b) by 130 days.

(21) Appl. No.: 17/844,092

(22) Filed: Jun. 20, 2022

(65) Prior Publication Data

US 2023/0409062 A1 Dec. 21, 2023

(51) Int. Cl.
*G05F 1/575* (2006.01)
*G05F 1/618* (2006.01)

(52) U.S. Cl.
CPC .............. *G05F 1/575* (2013.01); *G05F 1/618* (2013.01)

(58) Field of Classification Search
CPC .................................. G05F 1/56; G05F 1/575
See application file for complete search history.

(56) References Cited

U.S. PATENT DOCUMENTS 7,106,033 B1 * 9/2006 Liu ........................ G05F 1/575 323/280
7,843,180 B1 * 11/2010 Cilingiroglu ........... G05F 1/575 323/273
7,863,873 B2 1/2011 Hou et al.
8,169,203 B1 * 5/2012 Vemula .................. G05F 1/575 323/273
10,996,701 B1 5/2021 Wu et al.
10,998,816 B1 5/2021 Payak
2007/0018621 A1 * 1/2007 Mok ....................... G05F 1/575 323/280
2009/0001953 A1 * 1/2009 Huang .................... G05F 1/575 323/281
2010/0066320 A1 3/2010 Dasgupta et al.
2014/0077780 A1 3/2014 Teong et al.
2014/0091775 A1 * 4/2014 Tan ........................ G05F 1/575 323/280
2019/0258283 A1 * 8/2019 Pishdad .................. G05F 1/575
2021/0021270 A1 * 1/2021 Zhan ....................... G05F 1/561
2023/0085353 A1 * 3/2023 Lee ........................ G05F 1/575 323/222

OTHER PUBLICATIONS

European Patent Office search report Jun. 16, 2023.

* cited by examiner

*Primary Examiner* — Alex Torres-Rivera
(74) *Attorney, Agent, or Firm* — WPAT, P.C

(57) ABSTRACT

A low dropout regulator is provided. The low dropout regulator includes a gain-stage module, an output setting stage, and a detection circuit. The gain-stage module generates a gain-stage signal. The output setting stage is electrically connected to the gain stage module. The output setting stage outputs a load current to an output terminal in response to the gain-stage signal. The detection circuit is electrically connected to the gain stage module and the output setting stage. The detection circuit includes a monitor circuit and a compensation circuit. The monitor circuit is electrically connected to the output terminal. The monitor circuit compares a charge-up duration of the signal at the output terminal with a pre-defined threshold duration, and generates a comparison signal accordingly. The compensation circuit is electrically connected to the gain-stage module and the output terminal. The compensation circuit selectively performs frequency compensation in response to the comparison signal.

16 Claims, 4 Drawing Sheets

LOW DROPOUT REGULATOR

FIELD OF THE INVENTION

The present invention relates to a low dropout regulator, and more particularly to a low dropout regulator capable of detecting the location of a dominant pole and selectively performing frequency compensation.

BACKGROUND OF THE INVENTION

In electronic devices, linear regulators are utilized to stabilize and transform a supply voltage Vdd to a steady output voltage Vout. A low dropout (hereinafter, LDO) regulator is a type of linear regulator having advantages such as low cost, low noise, and fast voltage conversion.

FIG. 1 is a schematic diagram illustrating that an LDO regulator is adopted in an electronic device. The electronic device 10 includes an LDO regulator 13*a* and a load circuit 15. The LDO regulator 13*a* transforms a supply voltage Vdd to an output voltage Vout, and provides the output voltage Vout to the load circuit 15. The value of the output voltage Vout is predefined, depending on the requirement of the load circuit 15.

A voltage source 12 (for example, a battery) provides the supply voltage Vdd. However, the supply voltage Vdd is not stable, and the LDO regulator 13*a* is utilized. A loading capacitor Cld is electrically connected to the output terminal Nout and the ground terminal Gnd. For the sake of representation, a terminal and its signal are represented with the same symbol in the specification. For example, the ground voltage and the ground terminal are represented as Gnd in the specification.

Depending on the practical applications, the loading capacitor Cld might be integrated into the LDO regulator 13*a* (on-chip capacitor) or separately placed outside the LDO regulator 13*a* (off-chip capacitor). The use of an off-chip capacitor can provide frequency compensation and ensure stability. When the output resistance is large, a load current is small (light load condition), and the output pole starts to go toward low frequencies. This implies that the phase margin is reduced, and the stability issues should be concerned. Therefore, a large off-chip capacitor is adopted to make the output pole as the dominant pole. However, an off-chip capacitor needs a big area. On the other hand, the off-chip capacitor is not necessary for moderate or heavy load conditions, and the circuit cost can be reduced.

In practical applications, the LDO regulator 13*a* may operate with different load conditions. For the light load condition, an off-chip capacitor should be adopted to ensure stability and required load transient performance. For moderate to heavy loading conditions, stability and load transient performance can still be maintained even if the off-chip capacitor is not used.

It is known that a dominant pole affects the stability of the LDO regulator 13*a*, and the use of the off-chip capacitor changes the position of the dominant pole. However, whether the LDO regulator 13*a* is used with or without the off-chip capacitor is unknown in advance. Therefore, the LDO regulator 13*a* having the feasibility to selectively perform or not perform frequency compensation in response to the location of the dominant pole should be developed.

SUMMARY OF THE INVENTION

Therefore, the present invention relates to an LDO regulator having a detection circuit capable of detecting the location of the dominant pole. Based on the detection result, the LDO regulator is selectively compensated.

An embodiment of the present invention provides a low dropout regulator. The low dropout regulator includes a gain-stage module, an output setting stage, and a detection circuit. The gain-stage module generates a gain-stage signal. The output setting stage is electrically connected to the gain stage module. The output setting stage outputs a load current to an output terminal in response to the gain-stage signal. The detection circuit is electrically connected to the gain stage module and the output setting stage. The detection circuit includes a monitor circuit and a compensation circuit. The monitor circuit is electrically connected to the output terminal. The monitor circuit compares a charge-up duration of the signal at the output terminal with a pre-defined threshold duration and generates a comparison signal accordingly. The compensation circuit is electrically connected to the gain-stage module and the output terminal. The compensation circuit selectively performs frequency compensation in response to the comparison signal.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
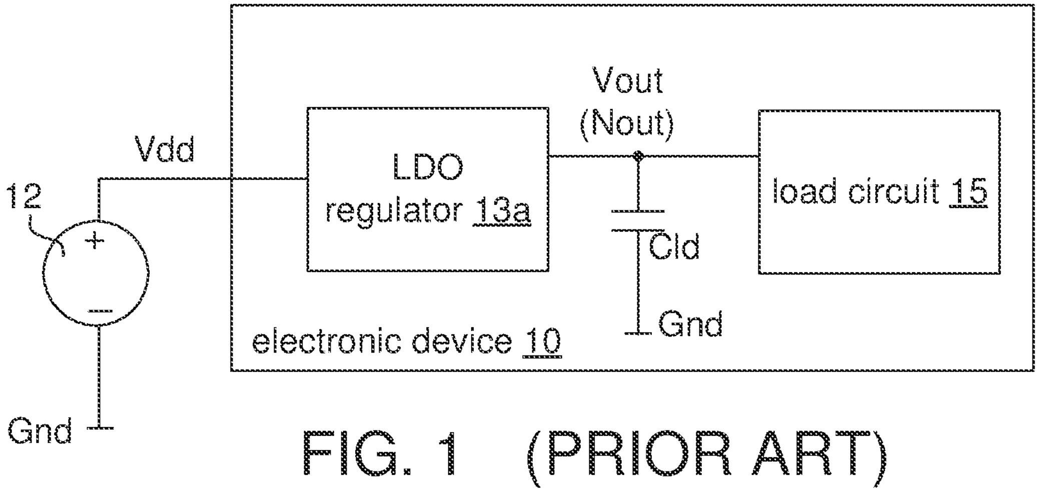
FIG. 1 (PRIOR ART)
FIG. 1 (prior art) is a schematic diagram illustrating that an LDO regulator is adopted in an electronic device.
Figure 2:
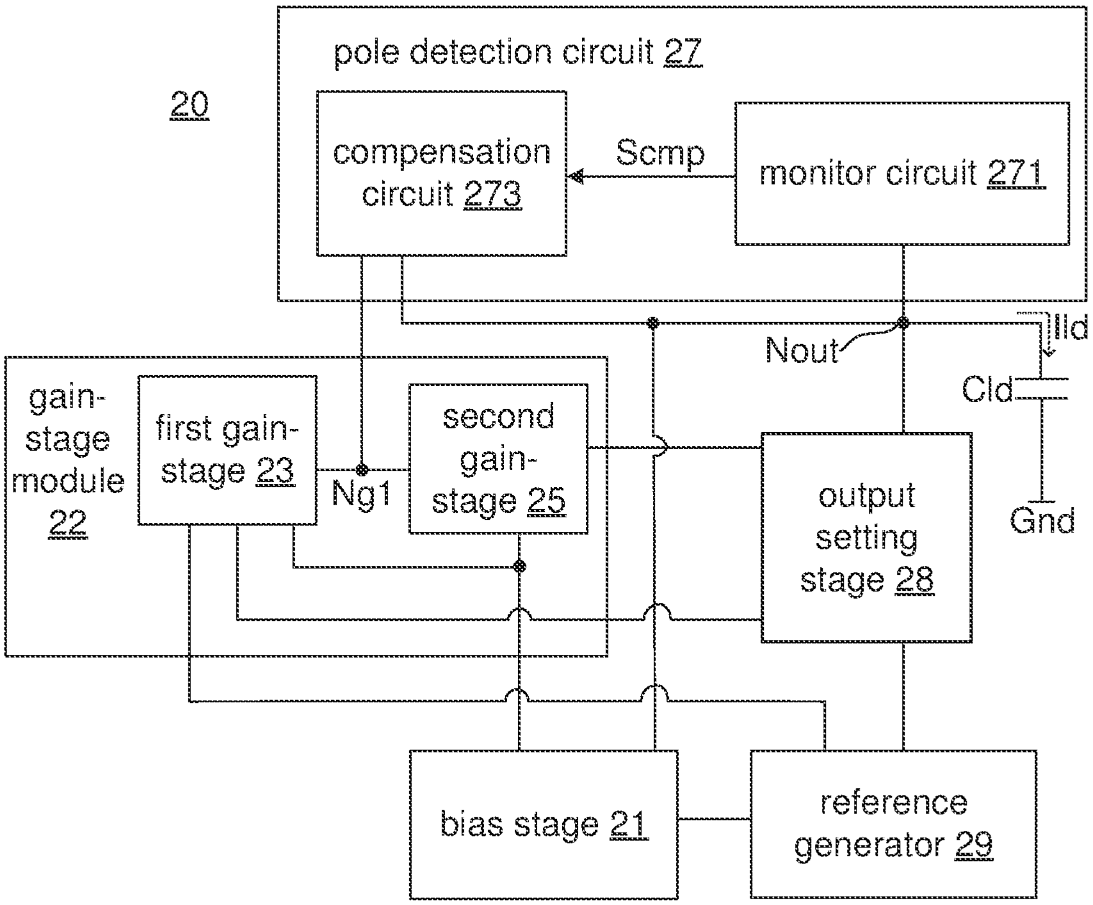
FIG. 2 is a block diagram illustrating an LDO regulator according to the embodiment of the present disclosure.

FIG. 2 is a block diagram illustrating an LDO regulator according to the embodiment of the present disclosure. The LDO regulator 20 includes a gain-stage module 22, a pole detection circuit 27, an output setting stage 28, a reference generator 29, a bias stage 21, and a loading capacitor Cld. The gain-stage module 22 includes a first gain-stage 23 and a second gain-stage 25, and the pole detection circuit 27 includes a monitor circuit 271 and a compensation circuit 273.

The loading capacitor Cld is electrically connected to the output terminal Nout and the ground terminal Gnd, and the loading capacitor Cld can be on-chip or off-chip.

The components in the LDO regulator 20 and their connections are introduced. The second gain-stage 25 attributes the total loop gain when the LDO regulator 20 operates under a heavy load condition.

The output setting stage 28 is based on a flipped voltage follower (hereinafter, FVF). The output setting stage 28 is electrically connected to the output terminal Nout, the first gain-stage 23, the second gain-stage 25, and the reference generator 29. The output setting stage 28 outputs the load current Ild to the output terminal Nout and a stable output voltage Vout is generated at the output terminal Nout.

The bias stage 21 is electrically connected to the first gain-stage 23, the second gain-stage 25, and the output setting stage 28. The reference generator 29 is electrically connected to the bias stage 21, the first gain-stage 23, and the output setting stage 28.

In the pole detection circuit 27, the monitor circuit 271 and the compensation circuit 273 are both electrically connected to the output terminal Nout, and the compensation circuit 273 is electrically connected to the first gain-stage 23 and the second gain-stage, via a gain-stage terminal Ng1. The monitor circuit 271 is electrically connected to the compensation circuit 273, and transmits a comparison signal Scmp to the compensation circuit 273.

Figure 4:
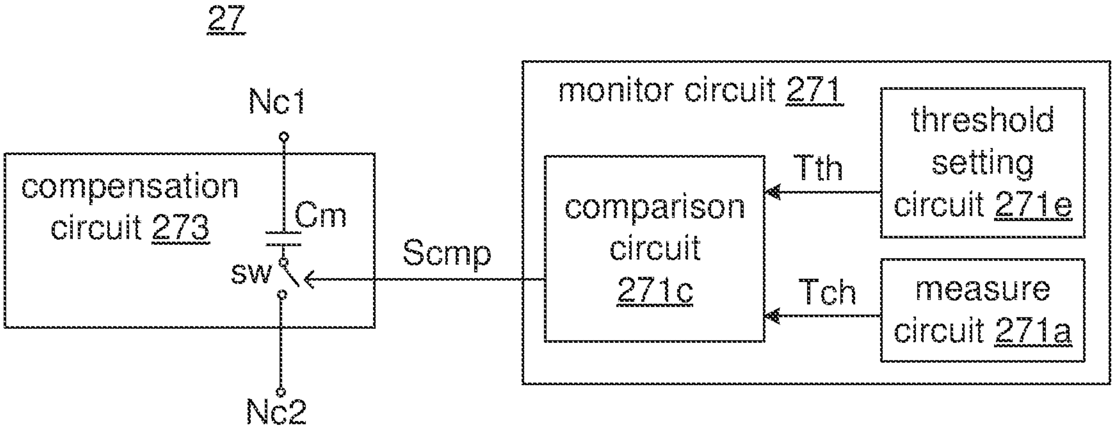
FIG. 4 is a schematic diagram illustrating an exemplary design of the pole detection circuit.

The exemplary implementations of the monitor circuit 271 and the compensation circuit 273 are shown in FIG. 4. The exemplary internal designs of the bias stage 21, the first gain-stage 23, the second gain-stage 25, the output selling stage 28, and the reference generator 29 are demonstrated in FIG. 6.

Figure 3A:
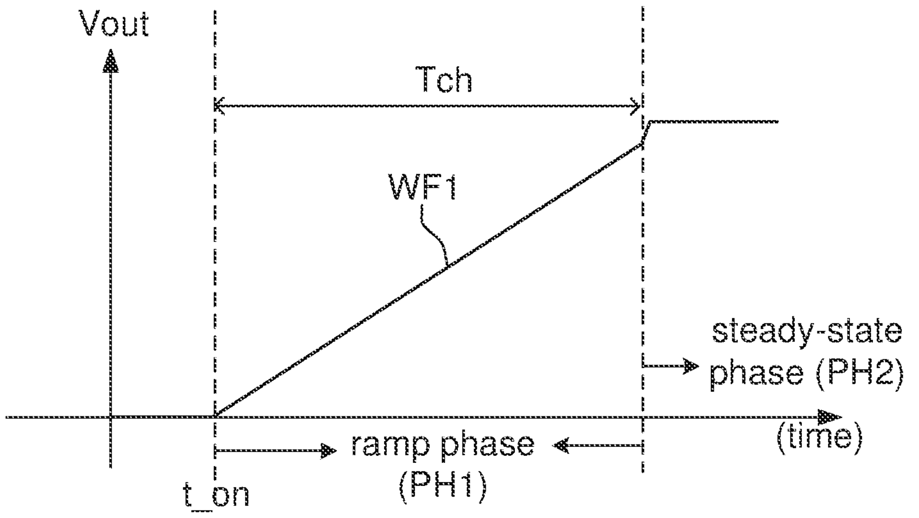
FIG. 3A is a schematic diagram illustrating changes of the output voltage Vout during the setup procedure of the LDO regulator.

FIG. 3A is a schematic diagram illustrating changes in the output voltage Vout during the setup procedure of the LDO regulator. The vertical axis represents the output voltage Vout, and the horizontal axis represents time. In FIG. 3A, time point t_on represents the time point when the electronic device is power-on.

The waveform WF1 represents how the output voltage Vout changes during the setup procedure. The setup procedure involves a ramp phase (PH1) and a steady-state phase (PH2). In the ramp phase (PH1), the output voltage Vout gradually increases from the ground voltage Gnd to a predefined output voltage. In the steady-state phase (PH2), the output voltage Vout remains constant (at the predefined output voltage). The duration of the ramp phase (PH1) is defined as a charge-up duration Tch, and the charge-up time Tch is changed with the location of the dominant pole, as FIG. 3B shows.

Figure 3B:
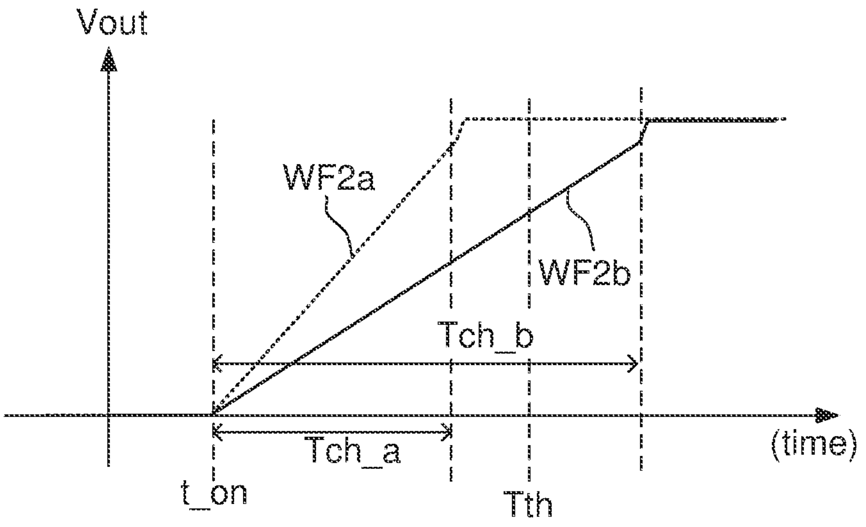
FIG. 3B is a schematic diagramming illustrating the relationship between the location of the dominant pole and the changes of the output voltage Vout during the setup procedure of the LDO regulator.

FIG. 3B is a schematic diagramming illustrating the relationship between the location of the dominant pole and the changes of the output voltage Vout during the setup procedure of the LDO regulator. The vertical axis represents the output voltage Vout, and the horizontal axis represents time.

The waveform WF2*a* represents how the output voltage Vout changes during the setup procedure when the dominant pole is located inside the gain-stage module 22. The charge-up duration corresponding to the waveform WF2*a* is represented as a charge-up time Tch_a.

The waveform WF2*b* represents how the output voltage Vout changes during the setup procedure when the dominant pole is located at the output terminal Nout. The charge-up duration corresponding to the waveform WF2*b* is represented as another charge-up duration Tch_b.

The slew rate of the waveform WF2*a* is relatively quick. The quick slew rate of the waveform WF2*a* implies that the loading capacitor Cld corresponding to the waveform WF2*a* can be quickly charged up, and its capacitance value is relatively small. Accordingly, the dominant pole is inside the LDO regulator 20, between the first gain-stage 23 and the second gain-stage 25.

On the other hand, the slow slew rate of the waveform WF2*b* implies that the loading capacitor Cld corresponding to the waveform WF2*b* cannot be quickly charged up, and its capacitance value is relatively big. Therefore, the dominant pole is located at the output terminal Nout.

Based on the waveforms WF2*a*, WF2*b*, it can be concluded that the charge-up duration Tch_a is shorter when the dominant pole is located inside the LDO regulator 20. Moreover, the charge-up duration Tch_b is longer when the dominant pole is located at the output terminal Nout.

According to the embodiment of the present disclosure, a pre-defined threshold duration Tth is defined and utilized to distinguish the location of the dominant pole. Firstly, the monitor circuit 271 detects the charge-up duration Tch. Then, the monitor circuit 271 compares the detected charge-up duration Tch with a pre-defined threshold duration Tth to identify the position of the dominant pole.

For example, in FIG. 3B, the dominate pole corresponding to the waveform WF2*a* can be identified as being located inside the gain-stage module 22 as the charge-up duration Tch_a is shorter than the pre-defined threshold duration Tth. On the other hand, the dominate pole corresponding to the waveform WF2*b* can be identified as being located at the output terminal Nout as the charge-up duration Tch_b is longer than the pre-defined threshold Tth.

FIG. 4 is a schematic diagram illustrating an exemplary design of the pole detection circuit. Please refer to FIGS. 2 and 4 together.

The monitor circuit 271 includes a measure circuit 271*a*, a threshold setting circuit 271*e*, and a comparison circuit 271*c*. The measure circuit 271*a* and the threshold setting circuit 271*e* are electrically connected to the comparison circuit 271*c*. The measure circuit 271*a* measures the charge-up duration Tch, and the threshold setting circuit 271*e* provides the pre-defined threshold duration Tth.

The implementations of the measure circuit 271*a*, the threshold setting circuit 271*e*, and the comparison circuit 271*c* are not limited. For example, the measure circuit 271*a* can be a digital counter counting the cycles needed for charging up the loading capacitor Cld, the threshold setting circuit 271*e* can be a register recording a count number representing the pre-defined threshold duration Tth, and the comparison circuit 271*c* can be a comparator.

In an alternative example, the measure circuit 271*a* may include a charging circuit (for example, a charge pump), and the comparison circuit 271*c* can be an analog comparator. The charging circuit charges the output terminal Nout and the charge-up duration Tch increases at the same time. The analog comparator detects the output terminal Nout and determines whether and when the charging should stop, based on comparison between the output terminal Nout and a threshold voltage Vth. The threshold voltage Vth corresponds to the pre-defined threshold duration Tth. The charging circuit stops charging once the output terminal Nout achieves the threshold voltage Vth. The pre-defined threshold voltage Vth can be provided by a bandgap circuit.

In another example, the measure circuit 271*a* might include a digital counter and a digital-to-analog converter (hereinafter, DAC). The digital counter counts an accumulated number representing the charge-up duration Tth, and the DAC converts the accumulated number to an accumulated comparison voltage Vcmp. The threshold setting circuit 271*e* can be a voltage source providing a threshold voltage Vth corresponding to the pre-defined threshold duration Tth. Then, the comparison circuit 271*c* can be an error amplifier utilized to compare the accumulated comparison voltage Vcmp and the threshold voltage Vth.

It is also possible to implement the monitor circuit 271 with analog circuits. In practical applications, as long as the monitor circuit 271 is capable of detecting the charge-up duration Tch of the LDO regulator and correctly generating the comparison signal Scmp to identify whether the charge-up duration Tch is longer than or equivalent to the pre-defined threshold duration Tth, the design of the monitor circuit 271 is not limited.

The compensation circuit 273 has connection terminals Nc1, Nc2. One of the connection terminals Nc1, Nc2 is electrically connected to the output terminal Nout, and the other of the connection terminals Nc1, Nc2 is electrically connected to the gain-stage terminal Ng1. Besides, the compensation circuit 273 is electrically connected to the comparison circuit 271*c*.

The compensation circuit 273 includes a Miller capacitor Cm and a switch sw, and the switch sw is controlled by the comparison signal Scmp. The Miller capacitor Cm is utilized for frequency compensation. The Miller capacitor Cm is connected between the gain-stage terminal Ng1 and the output terminal Nout and compensates the frequency when the switch sw is switched on. Alternately, a terminal of the Miller capacitor Cm is floating and the Miller capacitor Cm stops compensating the frequency when the switch sw is switched off.

Figure 5B:
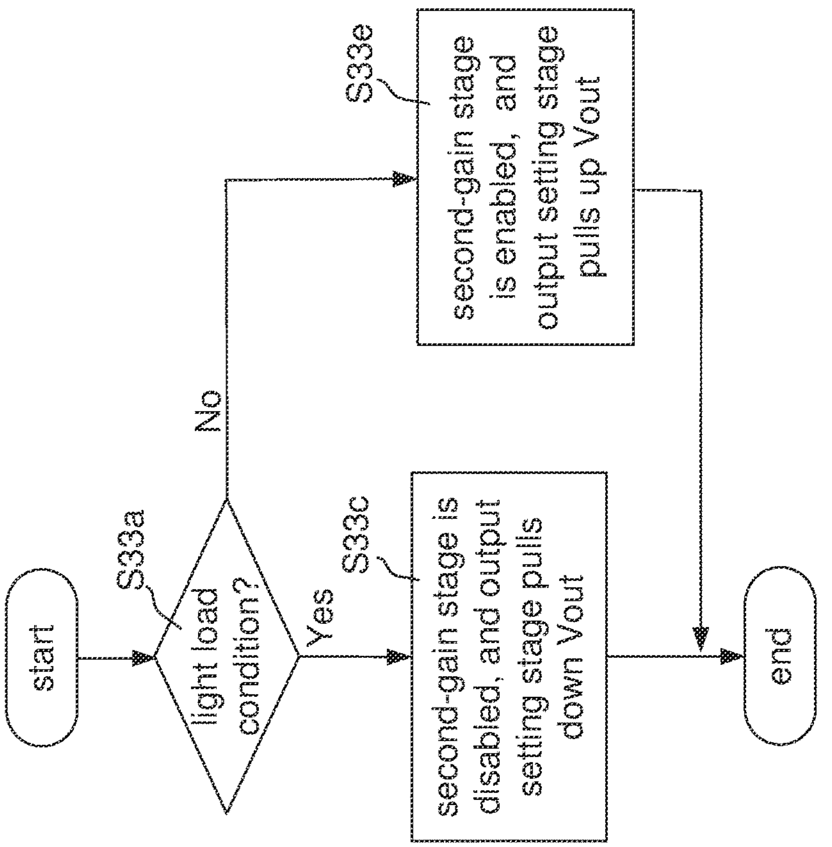
FIG. 5B is a flow diagram illustrating the operation of the LDO regulator during the steady-state phase (PH2)
Figure 5A:
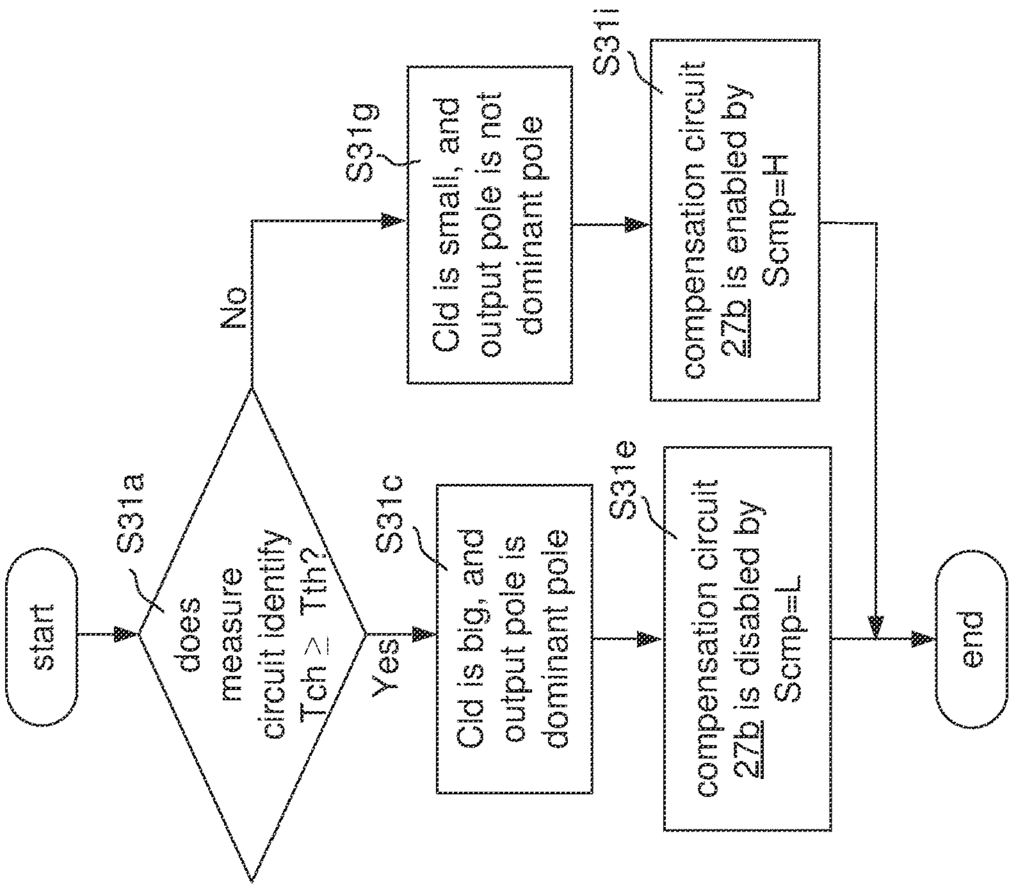
FIG. 5A is a flow diagram illustrating the operation of the LDO regulator during the ramp phase (PH1)

FIG. 5A is a flow diagram illustrating the operation of the LDO regulator during the ramp phase (PH1). Firstly, the comparison circuit 271*c* respectively acquires the pre-defined threshold duration Tth and the charge-up duration Tch from the threshold setting circuit 271*e* and the measure circuit 271*a*, and the comparison circuit 271*c* compares the charge-up duration Tch with the pre-defined threshold duration Tth (step S31*a*). The comparison results shows that whether the charge-up duration Tch is longer than the pre-defined threshold duration Tth, and this represents different locations of the dominant pole.

The dominant pole is considered as outside the LDO regulator 20 (step S31*c*) if the charge-up duration Tch is longer than or equivalent to the pre-defined threshold duration Tth (Tch≥Tth). As the charge-up duration Tch is relatively long, it implies that the loading capacitance Cld has a bigger capacitance value. Under such circumstances, the comparison circuit 271*c* sets the comparison signal Scmp to a logic low (Scmp=L) to disable the compensation circuit 273 (step S31*e*), and the LDO regulator 20 operates without frequency compensation.

The dominant pole is considered as inside the LDO regulator 20 (step S31*g*) if the charge-up duration Tch is shorter than the pre-defined threshold duration Tth (Tch<Tth). As the charge-up duration Tch is relatively short, it implies that the loading capacitance Cld has a smaller capacitance value. Under such circumstances, the comparison circuit 271*c* sets the comparison signal Scmp to a logic high (Scmp=H) to enable the compensation circuit 273 (step S31*i*), and the LDO regulator 20 operates with frequency compensation. After steps S31*e*, S31*i*, the LDO regulator 20 enters the steady-state phase (PH2).

FIG. 5B is a flow diagram illustrating the operation of the LDO regulator during the steady-state phase (PH2). In the steady-state phase (PH2), the operation of the LDO regulator 20 is related to the load condition (step S33*a*).

When the LDO regulator 20 encounters light-load conditions, a load current Ild decreases, and an overshoot occurs. Alternatively speaking, the output voltage Vout is temporarily increased. Under such circumstances, the second gain-stage 25 is disabled, and the output voltage Vout is pulled down to eliminate the overshoot (step S33*c*). Thus, the output voltage Vout remains constant during the steady-state phase (PH2).

When the LDO regulator 20 encounters the heavy-load condition, the load current Ild increases and an undershoot occurs. Alternatively speaking, the output voltage Vout is temporarily decreased. Under such circumstances, the second gain-stage 25 is enabled, and the output voltage Vout is pulled up to eliminate the undershoot (step S33*e*). Thus, the output voltage Vout remains constant during the steady-state phase (PH2).

Figure 6:
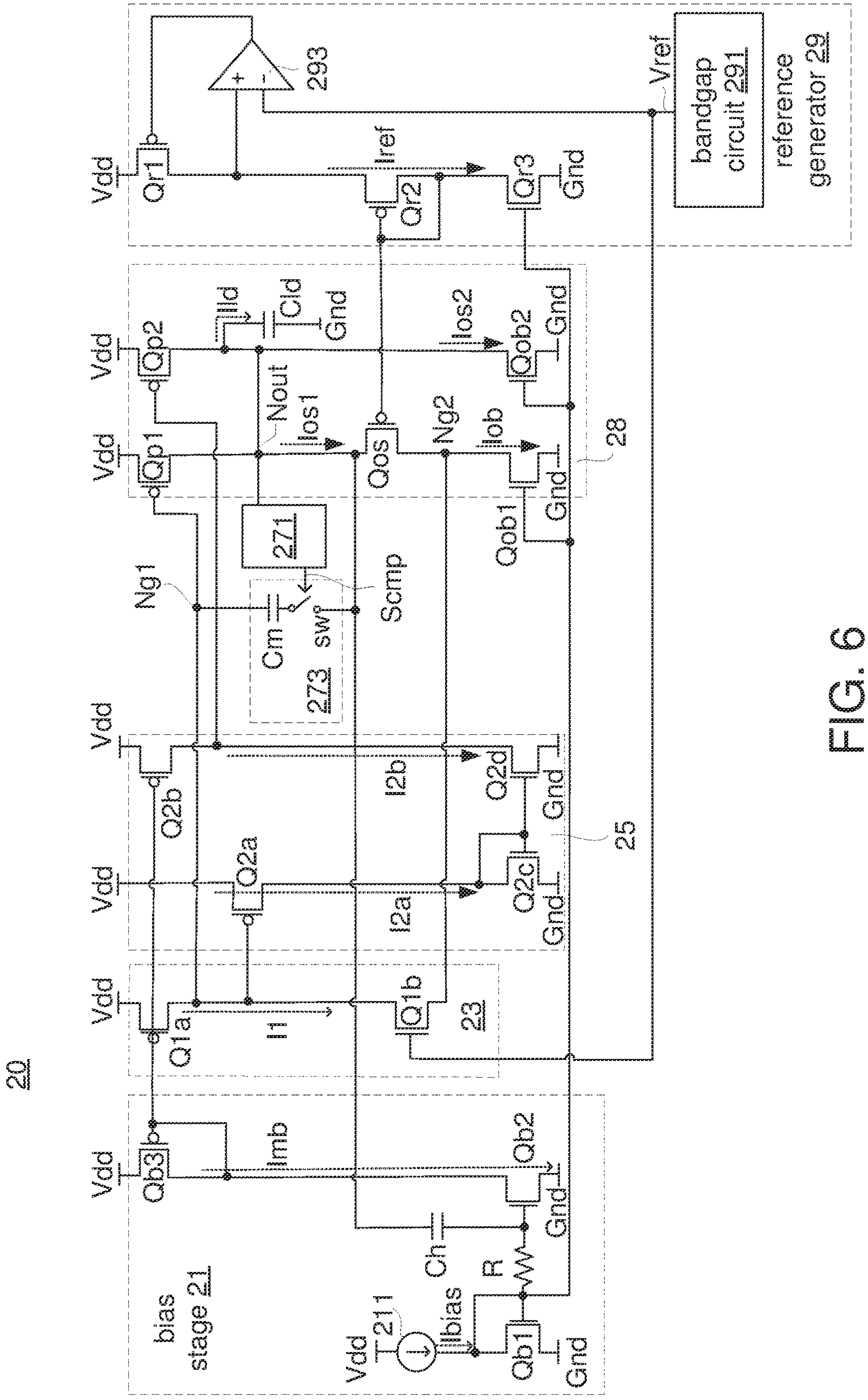
FIG. 6 is a schematic diagram illustrating an exemplary implementation of the exemplary capacitor-less LDO regulator according to the embodiment of the present disclosure.

FIG. 6 is a schematic diagram illustrating an exemplary implementation of the exemplary capacitor-less LDO regulator according to the embodiment of the present disclosure. Please refer to FIGS. 2 and 6 together. The internal components of the bias stage 21, the first gain-stage 23, the second gain-stage 25, and the reference generator 29 are respectively described below.

The bias stage 21 includes bias transistors Qb1, Qb2, Qb3, a current source 211, a resistor R, and a high-pass capacitor Ch. The bias transistor Qb3 is a PMOS transistor, and the bias transistors Qb1, Qb2 are NMOS transistors.

In the bias stage 21, the current source 211 continuously provides a sink bias current Ibias, and the sink bias current Ibias is duplicated to generate a mirrored current Imb flowing through the bias transistors Qb2, Qb3. The high-pass capacitor Ch and the resistor R jointly provide a high-pass function to prevent the sink bias current Ibias from being affected by an overshoot at the output terminal Nout.

The first gain-stage 23 includes first-stage transistors Q1*a*, Q1*b*. The first-stage transistor Q1*a* is a PMOS transistor, and the first-stage transistor Q1*b* is an NMOS transistor. As the bias transistor Qb3 and the first-stage transistor Q1*a* form a current mirror, a first-stage current I1 is generated by duplicating the mirrored current Imb. The first-stage current I1 flows through the first-stage transistor Q1*b*, and the signal at the gain stage terminal Ng2 (source terminal of the first-stage transistor Q1*b*) affects the first-stage current I1.

The second gain-stage 25 includes second-stage transistors Q2*a*, Q2*b*, Q2*c*, Q2*d*. The second-stage transistors Q2*a*, Q2*b* are PMOS transistors, and the second-stage transistors Q2*c*, Q2*d* are NMOS transistors. The second-stage transistor Q2*a* can be considered as a voltage to current converter, and the second-stage transistor Q2*a* is controlled by the signal at the gain-stage terminal (that is, the gain-stage signal) Ng1. Based on the current structure of the second-stage transistor Q2*b* and the bias transistor Qb3, the second-stage transistor Q2*b* remains to be switched on. The second-stage transistors Q2*c*, Q2*d* jointly form another current mirror.

The second gain-stage 25 is enabled only if the second-stage transistor Q2*a* is switched on, and the conduction of the second-stage transistor Q2*a* is related to the first-stage current I1. When the second-stage transistor Q2*a* is switched on, the second-stage current I2*a* flows through the second-stage transistors Q2*a*, Q2*c*, and the second-stage transistor Q2*d* duplicates the second-stage current I2*a* from the bias transistor Q2*c* to generate the second-stage current I2*b*.

The output setting stage 28 includes power transistors Qp1, Qp2, an output setting transistor Qos, and output bias transistors Qob1, Qob2. The power transistors Qp1, Qp2, and the output setting transistor Qos are PMOS transistors, and the output bias transistors Qob1, Qob2 are NMOS transistors. The power transistors Qp1, Qp2 are respectively controlled by outputs of the first gain-stage 23 and the second gain-stage 25. When the LDO regulator 20 encounters a light load condition, the power transistor Qp1 is switched on and the power transistor Qp2 is switched off. When the LDO regulator 20 encounters a heavy load condition, the power transistor Qp1 is switched off and the power transistor Qp2 is switched on.

The aspect ratio of the power transistor Qp2 is greater than the aspect ratio of the power transistor Qp1. For example, the aspect ratio of the power transistor Qp2 is equivalent to ten times the aspect ratio of the power transistor Qp1. Therefore, the power transistor Qp2 is switched on to conduct a greater load current Ild when the LDO regulator 20 encounters the heavy-load condition, and the power transistor Qp1 is switched on to conduct a lower load current Ild when the LDO regulator 20 encounters the light-load condition.

The aspect ratio of the output bias transistor Qob1 is greater than the aspect ratio of the output bias transistor Qob2. Thus, an output bias current Iob flowing through the output bias transistor Qb1 is greater than an output setting current Ios2 flowing through the output bias transistor Qob2.

The reference generator 29 includes a bandgap circuit 291, reference transistors Qr1, Qr2, Qr3, and an operational amplifier 293. The bandgap circuit 291 outputs a stable reference voltage Vref to an inverting input terminal (−) of the operational amplifier 293 and the gate terminal of the first-stage transistor Q1*b*. Thus, the first-stage transistor Q1*b* remains to be switched on and continuously conducts the first-stage current I1 to the gain-stage terminal Ng2.

As the reference transistor Qr2 and the output setting transistor Qos form a current mirror, the output setting current Ios1 flowing through the output setting transistor Qos duplicates the reference current Iref flowing through the reference transistor Qr2. Moreover, based on the current mirror structure, the signal at the output terminal Nout is equivalent to the non-inverting input terminal (+) of the operational amplifier 293.

Together with the virtual short feature of the operational amplifier 293, the output voltage Vout is equivalent to the reference voltage Vref (Nout=Vref). Therefore, the LDO regulator 20 can continuously output the constant output voltage Vout.

As mentioned above, the LDO regulator 20 might or might not be used together with an off-chip capacitor, depending on the load conditions. To support operations under different load conditions, the LDO regulator 20 needs a mechanism to detect whether a large loading capacitor is connected to the output terminal. With the pole detection circuit 27, the LDO regulator 20 can determine whether the output terminal Nout forms the dominant pole or not. Once this is determined, the appropriate actions can be taken by the LDO regulator 20 to adjust the frequency compensation.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A low dropout regulator, comprising:

a gain-stage module, configured to generate a gain-stage signal;

an output setting stage, electrically connected to the gain stage module, configured to output a load current to an output terminal in response to the gain-stage signal; and a detection circuit, electrically connected to the gain stage module and the output setting stage, comprising:

a monitor circuit, electrically connected to the output terminal, configured to compare a charge-up duration of an output voltage signal at the output terminal with a pre-defined threshold duration and generate a comparison signal accordingly; and a compensation circuit, electrically connected to the gain-stage module and the output terminal, configured to selectively perform frequency compensation in response to the comparison signal.

2. The low dropout regulator according to claim 1, wherein the compensation circuit comprises:

a Miller capacitor; and a switch, electrically connected to the Miller capacitor and the monitor circuit, configured to be selectively switched on by the comparison signal.

3. The low dropout regulator according to claim 2, wherein the compensation circuit performs the frequency compensation with the Miller capacitor when the switch is switched on, and the compensation circuit stops performing the frequency compensation when the switch is switched off.

4. The low dropout regulator according to claim 1, wherein the monitor circuit comprises:

a measure circuit, configured to measure the charge-up duration;

a threshold setting circuit, configured to provide the pre-defined threshold duration; and a comparison circuit, electrically connected to the measure circuit and the threshold setting circuit, configured to compare the charge-up duration and the pre-defined threshold duration and generate the comparison signal accordingly.

5. The low dropout regulator according to claim 4, wherein the comparison signal is set to a first logic level if the charge-up duration is longer than or equivalent to the pre-defined threshold duration.

6. The low dropout regulator according to claim 4, wherein the comparison signal is set to a second logic level if the charge-up duration is shorter than the pre-defined threshold duration.

7. The low dropout regulator according to claim 4, wherein the measure circuit is an analog circuit or a digital counter.

8. The low dropout regulator according to claim 1, wherein a dominant pole of the low dropout regulator is located inside the gain-stage module if the charge-up duration is shorter than the pre-defined threshold duration.

9. The low dropout regulator according to claim 8, wherein the compensation circuit performs the frequency compensation when the dominant pole of the low dropout regulator is located inside the gain-stage module.

10. The low dropout regulator according to claim 1, wherein a dominant pole of the low dropout regulator is located at the output terminal if the charge-up duration is longer than or equivalent to the pre-defined threshold duration.

11. The low dropout regulator according to claim 10, wherein the compensation circuit stops performing the frequency compensation when the dominant pole of the low dropout regulator is located at the output terminal.

12. The low dropout regulator according to claim 1, wherein the output voltage signal at the output terminal gradually increases when the low dropout regulator operates in a ramp phase, and the output voltage signal at the output terminal maintains constant when the low dropout regulator operates in a steady-state phase, wherein the steady-state phase is after the ramp phase.

13. The low dropout regulator according to claim 12, wherein the charge-up duration represents a duration that the output voltage signal at the output terminal rises from a ground voltage to a predefined output voltage.

14. The low dropout regulator according to claim 1, wherein a loading capacitor electrically connected to the output terminal and a ground terminal is an on-chip capacitor.

15. The low dropout regulator according to claim 1, wherein a loading capacitor electrically connected to the output terminal and a ground terminal is an off-chip capacitor.

16. The low dropout regulator according to claim 1, wherein the load current decreases when the low dropout regulator encounters a light-load condition, and the load current increases when the low dropout regulator encounters a heavy-load condition.

* * * * *